UNITED STATES PATENT OFFICE.

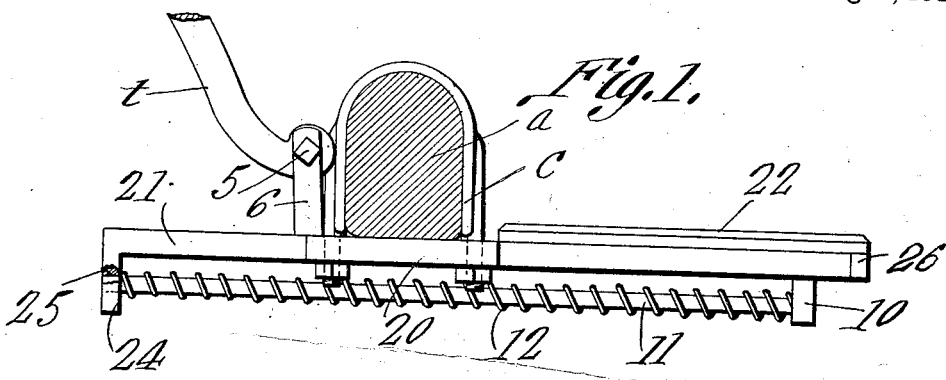
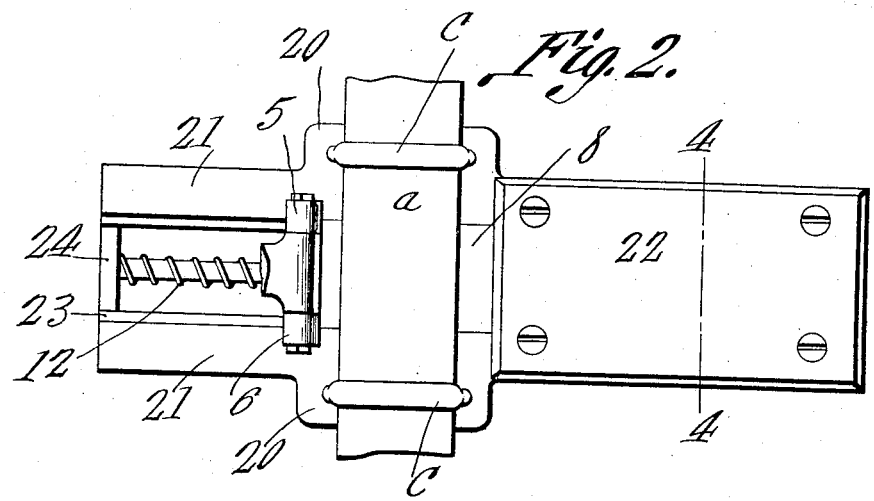
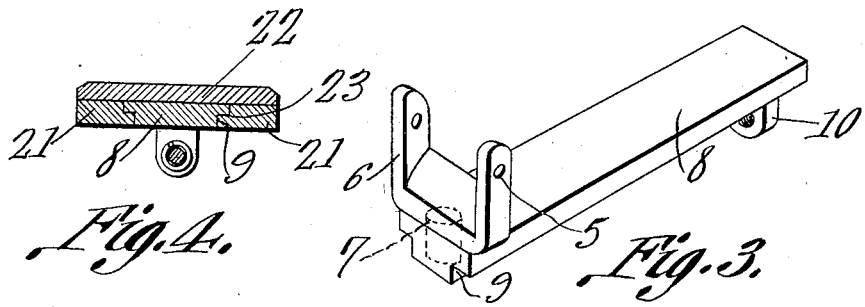

PLEASANT BEDWELL, OF CHARLESTON, TENNESSEE.

THILL-COUPLING.

1,000,143.  Specification of Letters Patent.  Patented Aug. 8, 1911.

Application filed January 23, 1911. Serial No. 604,252.

*To all whom it may concern:*

Be it known that I, PLEASANT BEDWELL, a citizen of the United States, residing at Charleston, in the county of Bradley and State of Tennessee, have invented a new and useful Thill-Coupling, of which the following is a specification.

This invention relates to carriages and wagons, and more especially to the thill coupling thereof; and the object of the same is to provide a spring-supported thill coupling attachment so as to overcome sudden jerks on the part of the horse or team.

To this end the invention consists in the details of construction hereinafter more fully described and claimed, and as shown in the drawings wherein—

Figure 1 is a side elevation of this device complete. Fig. 2 is a plan view thereof. Fig. 3 is a perspective detail of the movable yoke and its support. Fig. 4 is a section on the line 4—4 of Fig 2.

In the drawings the letter $a$ designates the axle, $c$ the clip, and $t$ the thill iron, these parts being of the usual or any preferred construction and no novelty claimed therefor.

Coming now more particularly to the present invention, the rear end of the thill iron is pivoted as at 5 within a yoke 6 whose shank 7 (seen in dotted lines in Fig. 3) is rigidly secured in any suitable way to a plate 8 which is undercut or rabbeted as at 9 along its edges and has an eye 10 depending rigidly from its rear end. In this eye is fixedly secured the rear end of a rod 11 upon which is coiled an expansive spring 12.

The clips $c$ (of which there are two as shown) pass over the axle $a$ and downward through ears 20 formed at the outer sides of two guides 21 which latter stand parallel and beneath the axle and are connected or bridged over at their rear ends as by a plate 22, and the inner edges of these guides are grooved as at 23 for the reception of the rabbet 9 on the plate 8. Their front ends are connected by a bridge plate 24, dropped so as to permit the passage of the rabbeted portion 9 of the plate 8, and through this bridge is an eye 25 large enough to permit the free passage of the rod 11. The rear ends of the guides 21 are connected by a cross bar 26 against which normally rests the rear end of the plate 8 when the spring stands in expanded condition.

With the parts standing normally as shown in the drawings, when power is suddenly applied to the thill iron $t$ as by the horse starting forward rather violently, the yoke 6 and plate 8 forming the support for the thill iron move bodily beneath the plate 22 and axle $a$, and the spring 12 is compressed, and after the vehicle has caught up with the sudden impulse of the horse, the parts resume their normal positions approximately as shown.

What is claimed is:—

In a thill coupling, the combination with the axle, two clips engaging over it, parallel guides extending beneath the axle and held by said clips and having grooves on their inner edges, said guides being connected at their rear ends, and having a dropped yoke connecting their front ends and provided with an eye; of a plate having rabbeted edges sliding in said grooves, a yoke on this plate and pivoted to the thill iron, an eye depending from its rear end, a rod fixed in this eye and sliding through that in the dropped yoke, and an expansive spring coiled on the rod between said eyes.

In testimony that I claim the foregoing as my own, I have hereto affixed my signature in the presence of two witnesses.

PLEASANT BEDWELL.

Witnesses:
J. H. WAGONER,
J. H. MARR.

Copies of this patent may be obtained for five cents each, by addressing the "Commissioner of Patents, Washington, D. C."